H. A. KEINER.
SHEET METAL CONTAINER.
APPLICATION FILED AUG. 12, 1908.
Reissued May 11, 1909. 12,955.
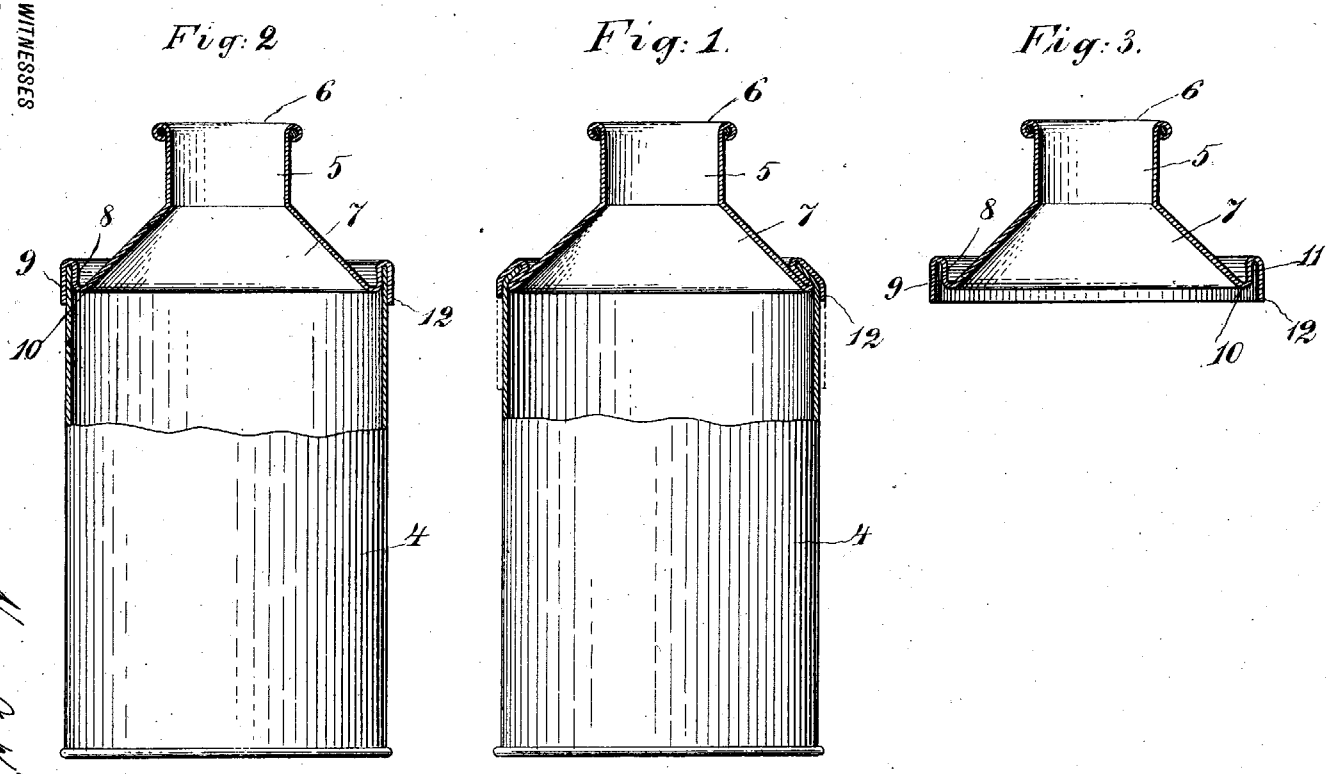
WITNESSES
F. W. Wiman
Aaron Ginsberg.
INVENTOR
Henry A. Keiner
BY
Thos. H. Bowerman
ATTORNEYS
THE NORRIS PETERS CO., WASHINGTON, D. C.

UNITED STATES PATENT OFFICE.

HENRY A. KEINER, OF NEW YORK, N. Y.

SHEET-METAL CONTAINER.

No. 12,955. Specification of Reissued Letters Patent. Reissued May 11, 1909.

Original No. 828,744, dated August 14, 1906, Serial No. 290,677. Application for reissue filed August 12, 1908. Serial No. 448,268.

*To all whom it may concern:*

Be it known that I, HENRY A. KEINER, a citizen of the United States, and a resident of the city of New York, borough of Brooklyn, in the county of Kings and State of New York, have invented certain new and useful Improvements in Sheet-Metal Containers, of which the following is a specification.

This invention relates to sheet metal containers, with more particular reference to larger sizes of cans as are generally employed for the transportation of milk from farms and dairies to the market.

It is well known that milk-cans, when filled with milk and loaded upon and unloaded from wagons or railway cars, particularly where they must be handled with great rapidity to prevent delay of the train, are generally subjected to very rough usage. Furthermore, where measuring cans are employed, unscrupulous dairymen have been known to subject the body of the can to a more or less forcible blow, for the purpose of indenting the same and thereby reducing its capacity. This intentional or unintentional rough usage of the can obviously tends sooner or later to break the joints, which are usually the weakest parts thereof, and it is therefore desirable in the production of milk-cans, particularly measuring cans, that suitable provision be made for making them particularly strong at the seams and joints.

This invention contemplates an improved manner of securing the body portion of the can to what is known as the breast thereof, with a view to providing a joint which will be proof against breakage through any ordinary intentional or unintentional rough usage of the can.

My invention will be more readily understood by reference to the accompanying drawings, forming a part of this specification, in which—

Figure 1 is a central sectional elevation of a container embodying my invention; Fig. 2 is a similar view of the container prior to the folding-operation hereinafter described, and Fig. 3 is a central sectional view of the integral breast or top of the container.

Referring now to the drawings in detail, numeral 4 refers to the cylindrical body portion of such a container as those to which I have referred, the bottom of which may be secured thereto in any suitable and desired manner. The top thereof is preferably an integral structure, which is in the usual manner formed to provide the wide neck 5, terminating in the mouth 6, and the tapering breast 7. The lower edge of this breast 7 is double flanged to provide the upwardly-projecting portion 8 and the downwardly-projecting portion 9, the latter terminating in a plane below the bend 10 at the bottom of the tapering portion of the breast 7. The double flange, comprising the portions 8 and 9, provides the annular groove or seat 11 which is adapted to receive and in which snugly fits the upper edge of the body portion 4 of the container, as is clearly shown in Fig. 2. Solder may now be flowed into the interstices between the upper edge of the body 4 and the adjacent portions 8 and 9 of the double flange, and in this manner a joint of comparatively great resisting strength is provided. While the can may be satisfactorily used in this shape, I much prefer to subject the same, prior to the soldering operation, to a spinning operation by which the upwardly projecting double flange, including the portions 8 and 9 thereof and the interposed upper edge of the can body 4, is folded or bent down against the side wall of the can and preferably against the tapering breast 7 thereof, as shown in Fig. 1. Solder may now be applied in the manner hereinbefore suggested, and the strength of this joint be thus greatly increased through this interlocking operation. It will be noted that the lower edge of the portion 9 of the double flange, being below the bend 10 at the bottom of the breast 7, forms a projecting rim 12 which still further augments the strength of this joint.

I claim as new and desire to secure by Letters Patent:

1. In a sheet metal container, the combination, with the body portion, of a breast portion which increases in diameter from the neck to the base thereof, the lower edge of said breast portion being double flanged to provide an upwardly-projecting and a downwardly-projecting wall which form an annular groove or seat for the upper edge of said body portion which is suitably secured therein, said double flange, including the upper edge of said body portion therein, being bent or folded against the wall of the container.

2. In a sheet metal container, the combination, with the body portion, of a breast portion which increases in diameter from the neck to the base thereof, the lower edge of said breast portion being double flanged to provide an upwardly-projecting portion and a downwardly-projecting wall forming an annular groove or seat for the upper edge of said body portion which is suitably secured therein, said double flange, including the upper edge of said body portion therein, being folded down against said breast.

3. In a sheet metal container, the combination, with the body portion, of a tapering breast portion, the lower edge of said breast portion being double flanged to provide an upwardly-projecting portion and a downwardly-projecting wall forming an annular groove or seat for the upper edge of said body portion which is suitably secured therein, said double flange, including the upper edge of said body portion therein, being folded down against said breast, the downwardly-projecting wall of said flange terminating in a plane below the bend at the lower edge of said upwardly-projecting wall and thus forming an annular protecting rib when said flange is folded.

In testimony of the foregoing, I have hereunto set my hand in the presence of two witnesses.

HENRY A. KEINER

Witnesses:
L. M. PHILLIPS,
P. FRANK SONNETT